United States Patent
Pringnitz

(10) Patent No.: US 10,091,948 B2
(45) Date of Patent: Oct. 9, 2018

(54) LIGHT POLE SAW

(71) Applicant: Wicked Tuff Gear, LLC, Kerrville, TX (US)

(72) Inventor: Todd Pringnitz, Mount Pleasant, IA (US)

(73) Assignee: Wicked Tuff Gear, LLC, Kerrville, TX (US)

( * ) Notice: Subject to any disclaimer, the term of this patent is extended or adjusted under 35 U.S.C. 154(b) by 441 days.

(21) Appl. No.: 14/746,152

(22) Filed: Jun. 22, 2015

(65) Prior Publication Data

US 2016/0000017 A1    Jan. 7, 2016

Related U.S. Application Data

(60) Provisional application No. 62/019,948, filed on Jul. 2, 2014.

(51) Int. Cl.
*A01G 3/08* (2006.01)
*B25G 1/04* (2006.01)

(52) U.S. Cl.
CPC .............. *A01G 3/083* (2013.01); *B25G 1/04* (2013.01)

(58) Field of Classification Search
CPC .......... A01G 3/06; A01G 3/062; A01G 3/065; A01G 3/067; A01G 3/08; A01G 3/083; A01G 3/085; B25G 1/04
USPC ......................................... 30/153–162, 296.1
See application file for complete search history.

(56) References Cited

U.S. PATENT DOCUMENTS

| | | | |
|---|---|---|---|
| 1,797,589 A | 3/1931 | Price | |
| 2,593,323 A | 4/1952 | Magnussen et al. | |
| 2,867,363 A * | 1/1959 | Knemmerling | B23Q 13/00 206/349 |
| 3,317,997 A * | 5/1967 | Hedstrom | A01G 3/065 16/429 |
| 3,727,956 A * | 4/1973 | Popeil | A47L 11/4075 285/398 |
| 3,835,535 A | 9/1974 | Robison et al. | |
| 4,167,811 A | 9/1979 | Barrett | |

(Continued)

FOREIGN PATENT DOCUMENTS

WO    WO 2013036967 A2 *  3/2013  ............... B25G 1/04

OTHER PUBLICATIONS

Wicked Tough Hand Saw, Snagged Mar. 22, 2012 at http://www.wickedtreegear.com/wickedstory/wicked.html.

*Primary Examiner* — Jason Daniel Prone
*Assistant Examiner* — Richard Crosby, Jr.
(74) *Attorney, Agent, or Firm* — Crawford Maunu PLLC

(57) ABSTRACT

A pole saw apparatus includes a saw blade, a pole, and a tubular adapter connecting the saw blade to the pole. The adapter includes an obround blade-receiving end that stably telescopingly engage sides of the blade-receiving end, with bolts fixing the blade on the adapter. The adapter also includes a pole-engaging end that is cylindrically shaped to telescopingly engage the anchoring end of the pole. A friction clamp includes a transverse shaft extending through the pole, the shaft being shaped to slide into longitudinal slots in the pole-engaging end of the adapter and then rotate into circumferential slots where it is not longitudinally removable. A rotatable cam handle on the clamp is manipulated to create circumferential friction to hold (or release) the adapter on the pole. The blade, adapter and pole align along a common centerline for robust and balanced use.

10 Claims, 8 Drawing Sheets

(56) References Cited

U.S. PATENT DOCUMENTS

| | | | | |
|---|---|---|---|---|
| 4,211,003 A * | 7/1980 | Collins | B26B 29/025 | 224/232 |
| 4,219,064 A * | 8/1980 | Lozano | F16B 37/041 | 411/103 |
| 4,518,162 A * | 5/1985 | Oates | A63B 21/072 | 403/349 |
| 4,535,539 A * | 8/1985 | Friedman | B26B 1/046 | 30/159 |
| 4,718,200 A * | 1/1988 | Miquelot | B24D 15/084 | 30/138 |
| D300,112 S | 3/1989 | Osterhout | | |
| D304,154 S | 10/1989 | Osterhout | | |
| 4,911,573 A * | 3/1990 | Pietro | B25G 3/16 | 285/361 |
| 4,958,395 A * | 9/1990 | Busskohl | B23D 61/121 | 30/144 |
| 5,099,539 A * | 3/1992 | Forester | A47L 1/06 | 15/144.3 |
| 5,138,768 A * | 8/1992 | Collins | B26B 3/06 | 224/232 |
| 5,211,322 A * | 5/1993 | Nealy | B26B 29/025 | 224/230 |
| D346,937 S | 5/1994 | Backman | | |
| 5,326,206 A * | 7/1994 | Moore | F16B 5/0208 | 29/525.02 |
| 5,458,144 A * | 10/1995 | Lavine | A45B 9/02 | 135/24 |
| 5,553,386 A | 9/1996 | Hsu | | |
| 5,634,276 A | 6/1997 | Lin | | |
| 5,661,868 A * | 9/1997 | Panagakos | A46B 5/0033 | 15/144.4 |
| 5,694,695 A * | 12/1997 | Lund | B25G 1/04 | 15/144.4 |
| 5,706,941 A * | 1/1998 | Erisoty | B26B 29/00 | 206/349 |
| D392,164 S | 3/1998 | Bomgaars, Jr. | | |
| 5,787,536 A | 8/1998 | Pate | | |
| 5,794,345 A | 8/1998 | Ryon et al. | | |
| D406,039 S | 2/1999 | Okada | | |
| 5,933,965 A * | 8/1999 | Linden | A01G 3/0255 | 30/245 |
| 6,085,681 A * | 7/2000 | Morton | B63B 21/54 | 114/221 R |
| 6,088,860 A * | 7/2000 | Poehlmann | B25F 1/003 | 30/161 |
| D433,914 S | 11/2000 | Chu | | |
| D444,684 S | 7/2001 | Kimura | | |
| 6,253,455 B1 | 7/2001 | Eriksson et al. | | |
| 6,298,564 B1 | 10/2001 | Voser et al. | | |
| 6,308,419 B1 * | 10/2001 | Neshat | B26B 29/025 | 30/151 |
| 6,345,445 B1 * | 2/2002 | Schofield | A01G 3/083 | 30/245 |
| 6,367,121 B1 * | 4/2002 | MacMillan | B25G 1/04 | 15/235.8 |
| D461,999 S | 8/2002 | Nimmo | | |
| 6,434,838 B1 * | 8/2002 | Mai | B23Q 13/00 | 30/151 |
| 6,446,341 B1 * | 9/2002 | Wang | B26B 1/046 | 30/123 |
| 6,526,664 B2 * | 3/2003 | Cech | A01G 3/08 | 30/245 |
| 6,546,596 B2 * | 4/2003 | Grote | B05C 17/0205 | 15/143.1 |
| D482,257 S | 11/2003 | Taylor et al. | | |
| 6,742,264 B1 * | 6/2004 | Urion | B23D 51/10 | 30/166.3 |
| 6,875,917 B1 * | 4/2005 | Wood | H02G 1/02 | 174/38 |
| 6,883,208 B1 * | 4/2005 | Huang | B25G 1/04 | 16/110.1 |
| 6,889,917 B2 * | 5/2005 | Fahy | A47L 13/22 | 239/525 |
| 6,898,858 B1 | 5/2005 | Spell | | |
| 6,925,686 B2 * | 8/2005 | Heathcock | B25G 1/04 | 15/144.4 |
| 7,017,234 B2 | 3/2006 | Anderson | | |
| 7,065,885 B1 | 6/2006 | Chen | | |
| D530,164 S | 10/2006 | Farley | | |
| D530,180 S | 10/2006 | Klecker et al. | | |
| D535,026 S * | 1/2007 | Griffin | A61B 17/3211 | D24/146 |
| 7,331,567 B2 * | 2/2008 | Li | F16B 7/14 | 248/354.6 |
| D582,243 S | 12/2008 | Freeman et al. | | |
| D582,747 S | 12/2008 | Freeman et al. | | |
| D588,433 S | 3/2009 | van Deursen | | |
| 7,574,806 B2 * | 8/2009 | Wang | B25G 1/04 | 16/429 |
| 7,631,389 B2 * | 12/2009 | St. James | B25G 1/04 | 15/144.1 |
| 7,721,377 B2 * | 5/2010 | Jungklaus | B25G 1/04 | 15/144.1 |
| 7,721,391 B2 * | 5/2010 | Bukovitz | B25G 3/14 | 15/145 |
| D637,882 S | 5/2011 | Bloch | | |
| 7,958,640 B1 | 6/2011 | Mandriota | | |
| 8,079,151 B2 * | 12/2011 | Chen | A01G 3/08 | 15/144.1 |
| D664,823 S | 8/2012 | Pringnitz | | |
| 8,266,806 B2 | 9/2012 | Holmroos | | |
| 8,469,423 B1 * | 6/2013 | Crowley, Jr. | B25G 1/04 | 294/174 |
| 8,490,250 B2 * | 7/2013 | Lanz | B25G 1/04 | 16/427 |
| 8,590,427 B2 * | 11/2013 | Murphy | B26B 29/025 | 206/349 |
| 8,595,902 B2 * | 12/2013 | Troudt | B25G 1/04 | 16/427 |
| 8,615,889 B2 * | 12/2013 | Martinsson | B27B 17/14 | 30/383 |
| 8,667,648 B2 * | 3/2014 | Vierck | A01D 34/416 | 16/422 |
| 8,763,260 B2 * | 7/2014 | Ranieri | B23D 51/10 | 30/512 |
| 8,875,405 B2 * | 11/2014 | Trees | A61B 17/3211 | 30/151 |
| 8,882,166 B2 * | 11/2014 | Ramsey | B25F 5/026 | 16/429 |
| 8,959,778 B2 * | 2/2015 | Baid | A61B 17/3213 | 30/151 |
| D723,891 S * | 3/2015 | Pringnitz | B27B 21/04 | D8/9 |
| 9,050,730 B2 * | 6/2015 | Miyawaki | B26B 29/025 | |
| 9,101,095 B2 * | 8/2015 | Pringnitz | B27B 21/04 | |
| 9,109,616 B1 * | 8/2015 | Ballentine | F16B 7/1454 | |
| 9,185,851 B2 * | 11/2015 | Miyawaki | A01G 3/083 | |
| 9,288,947 B1 * | 3/2016 | Burnette | A01G 3/083 | |
| 9,403,267 B2 * | 8/2016 | Ho | B25G 1/04 | |
| 9,532,510 B2 * | 1/2017 | Pringnitz | B27B 21/04 | |
| 9,591,809 B2 * | 3/2017 | Gieske | A01G 3/086 | |
| 9,651,073 B2 * | 5/2017 | Bukovitz | F16B 7/1454 | |
| 2002/0194739 A1 | 12/2002 | Krane et al. | | |
| 2004/0020062 A1 | 2/2004 | Ducret | | |
| 2004/0221457 A1 * | 11/2004 | Shen | B26B 29/025 | 30/151 |
| 2005/0097691 A1 * | 5/2005 | Tsuchiya | A47L 13/20 | 15/144.4 |
| 2005/0141957 A1 * | 6/2005 | Chen | F16B 2/12 | 403/290 |
| 2006/0048397 A1 | 3/2006 | King et al. | | |
| 2007/0108756 A1 * | 5/2007 | Laakso | A63C 11/221 | 280/823 |
| 2010/0037469 A1 * | 2/2010 | Chubb | A01G 3/00 | 30/198 |
| 2010/0170547 A1 * | 7/2010 | Pietrzak | A45B 9/00 | 135/75 |

(56) References Cited

U.S. PATENT DOCUMENTS

| | | | | |
|---|---|---|---|---|
| 2012/0102755 | A1* | 5/2012 | Racov | A01D 34/4167 |
| | | | | 30/142 |
| 2014/0000065 | A1* | 1/2014 | Bukovitz | B25G 3/00 |
| | | | | 16/429 |
| 2015/0089821 | A1* | 4/2015 | Troudt | B25G 1/04 |
| | | | | 30/519 |
| 2016/0000017 | A1* | 1/2016 | Pringnitz | A01G 3/083 |
| | | | | 144/343 |
| 2016/0199973 | A1* | 7/2016 | Wood | B25G 1/04 |
| | | | | 16/429 |
| 2016/0236339 | A1* | 8/2016 | Flaherty | B25G 1/01 |
| 2017/0001297 | A1* | 1/2017 | Deville | A01G 3/0251 |
| 2017/0079215 | A1* | 3/2017 | Bian | A01G 3/08 |

* cited by examiner

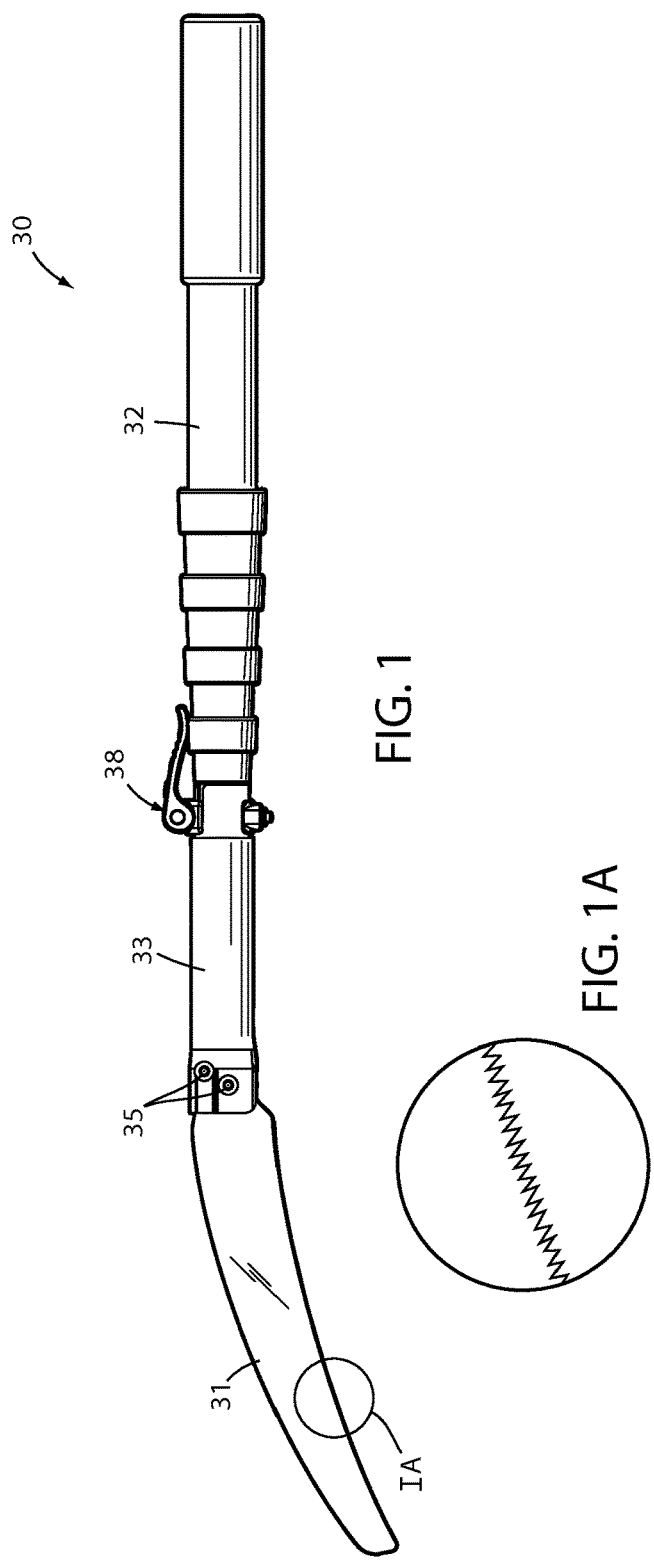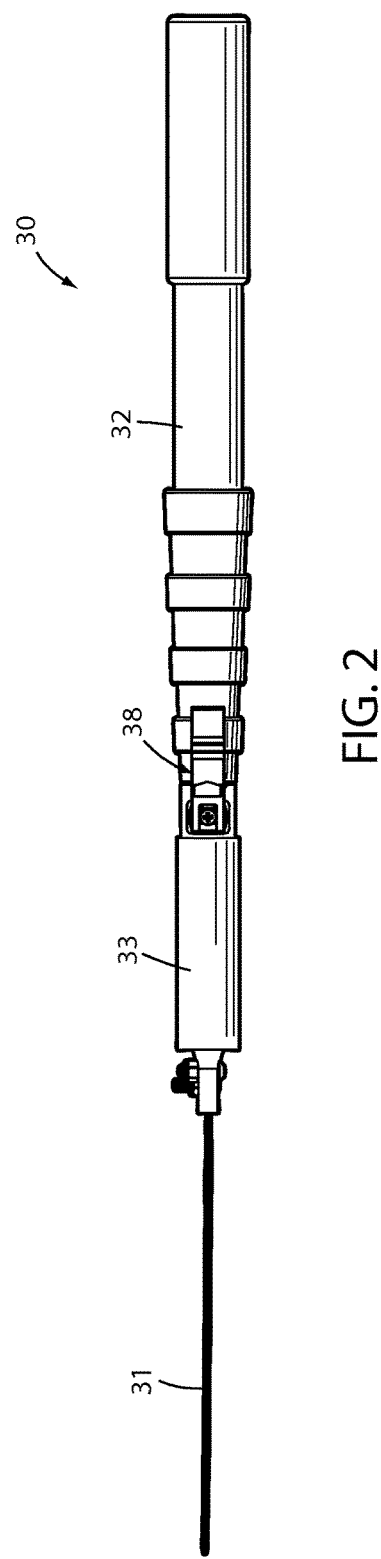

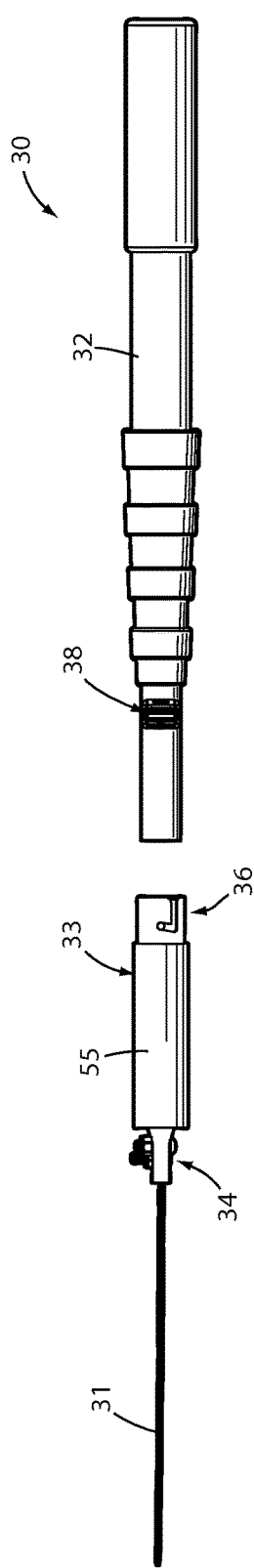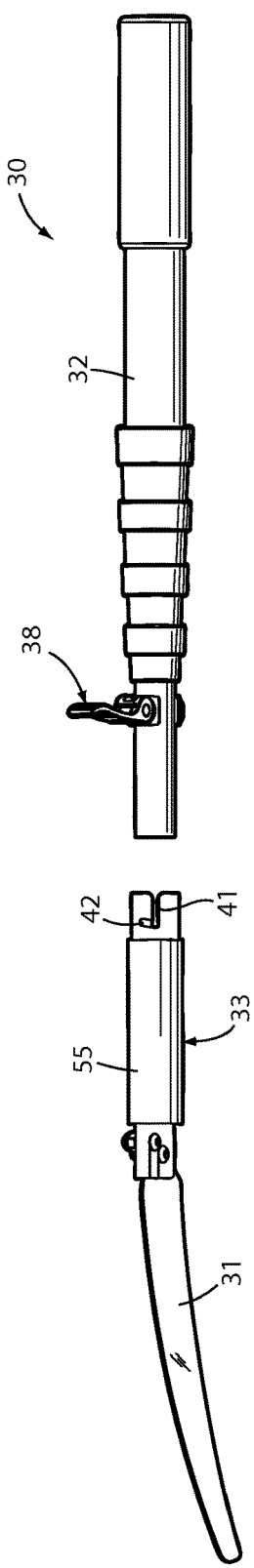

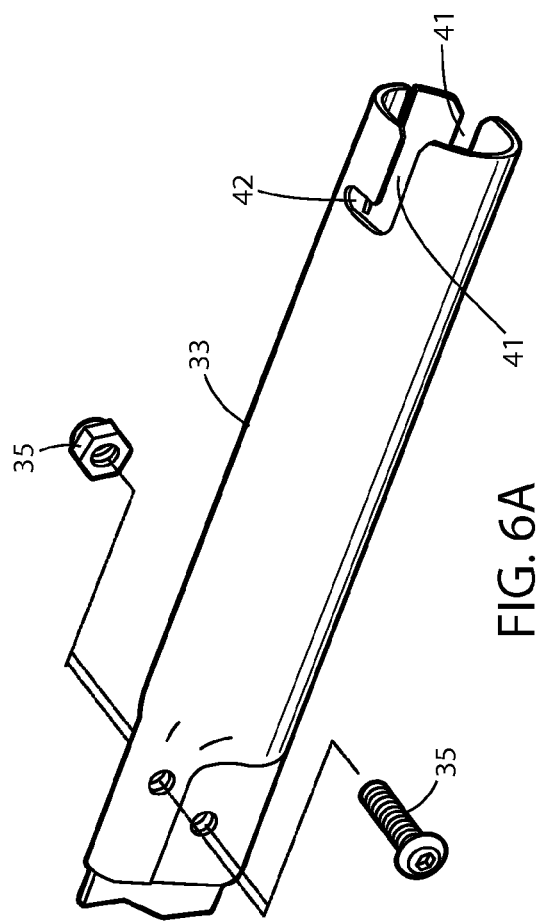
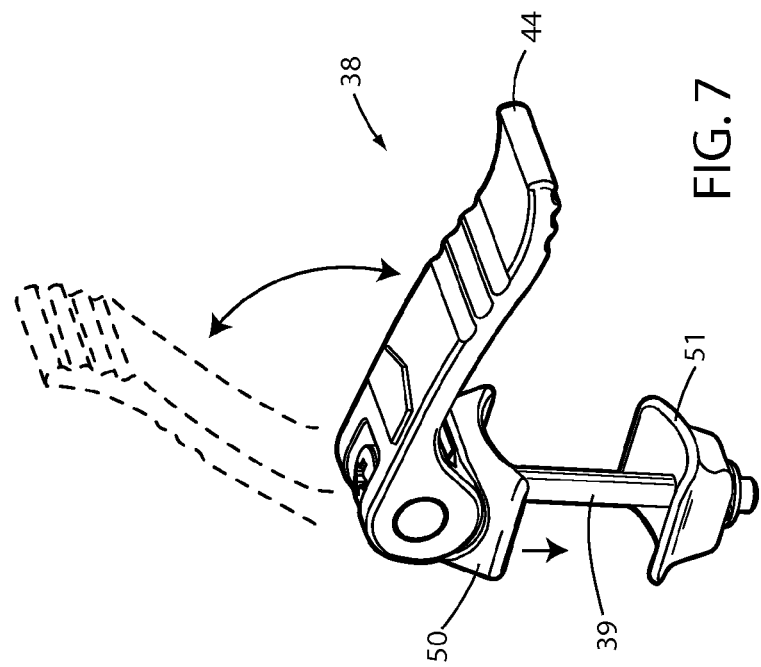

LIGHT POLE SAW

This application claims benefit under 35 USC section 119(e) of U.S. Provisional Application Ser. No. 62/019,948, filed Jul. 2, 2014, entitled ULTRA LIGHT POLE SAW, the entire contents of which are incorporated herein by reference.

BACKGROUND OF THE INVENTION

The present invention relates to pole saws, and more particularly to a durable pole saw that is light in weight but made with a robust design from durable components for rough outdoor use.

Pole saws with collapsible poles allow the user to trim tree limbs at many different heights, effectively and efficiently. Preferably, the saws are made with a robust and durable design since the saws are often subject to abuse and difficult operating conditions. Weight can also be an issue, since hunters and outdoorsmen may carry the saw into the woods, or gardeners and landscapers may carry the saw around a yard as they are working. Ergonomics is also important, including an ability to use the saw comfortably when the pole is extended or retracted. Notably, the outdoor saw industry is competitive, such that part and assembly costs must be minimized, and the total number of parts also minimized. It is desired to provide a pole saw that ergonomically addresses these challenges.

SUMMARY OF THE INVENTION

In one aspect of the present invention, a pole saw apparatus includes a saw blade with an apertured end for attachment; a pole with an anchoring end for attachment; and a tubular adapter having a blade-receiving end and a pole-engaging end, the blade-receiving end being obround and shaped to stably telescopingly engage sides of the blade-receiving end, the pole-engaging end being cylindrically shaped to telescopingly engage the anchoring end of the pole and including longitudinal slots leading into the pole-engaging end and circumferential slots extending partially around the pole-engaging end. At least one fastener engages aligned holes in the apertured end and in the tubular adapter to secure the apertured end in place. A clamp includes a shaft that extends transversely through the pole-engaging end, the shaft being shaped to slip into the longitudinal slots in the anchoring end of the pole and then rotate into the circumferential slots so that the shaft cannot slide longitudinally out of engagement with the pole-engaging end; the clamp further including a cammed handle that is movable between a loose position where the pole-engaging end can be rotated and slid longitudinally in the anchoring end, and that is movable to a clamped position where the pole-engaging end is clamped and frictionally prevented from rotation and/or sliding in the anchoring end.

In a narrower form of the present invention, the clamp includes first and second tube-engaging pieces, the first tube-engaging piece having a first cylindrical surface engaging the anchoring end of the pole and having an arcuate surface operably slidably engaging a cam on the cammed handle so that when rotated, the cammed handle pulls the shaft to thus tension the second tube-engaging piece laterally to create friction.

In a narrower form of the present invention, the at least one fastener includes two bolts fixing the saw blade, holding the blade in-plane with a centerline of the adapter and in-plane with a centerline of the pole.

In a narrower form of the present invention, a sleeve of foam on the adapter forms a handle that is ergonomically shaped and located adjacent and in-line with the blade.

In another aspect of the present invention, a pole saw apparatus comprises a saw blade, a pole, and a tubular adapter connecting the saw blade to the pole. The adapter includes a blade-receiving end that is obround to stably telescopingly engage sides of the saw blade, with bolts fixing the blade on the adapter. The adapter also includes a pole-engaging end that is cylindrically shaped to telescopingly engage the pole. A friction clamp includes a transverse shaft in the pole that is shaped to slide into longitudinal slots and then rotate into circumferential slots in the pole-engaging end of the tubular adapter so that the adapter cannot be longitudinally removed. The friction clamp further includes a rotatable cam handle that can be manipulated to, when rotated, create circumferential friction to hold the adapter on the pole.

In another aspect of the present invention, a method includes providing a pole saw apparatus including a saw blade, a pole, and an adapter holding the saw blade on the pole; sawing a high branch while holding the pole using the apparatus; disconnecting the pole from the adapter; and sawing a low branch while holding the adapter without the pole attached.

In another aspect of the present invention, a pole saw apparatus includes a saw blade, a pole, a tubular adapter connecting the saw blade to the pole, and a scabbard configured to slip onto and protect the saw blade from damage and abuse when not in use, the scabbard including a friction-generated biased retainer holding the scabbard on the saw blade when positioned on the blade.

These and other aspects, objects, and features of the present invention will be understood and appreciated by those skilled in the art upon studying the following specification, claims, and appended drawings.

BRIEF DESCRIPTION OF DRAWINGS

FIGS. 1-2 are side and top views of the apparatus embodying the present invention, with FIG. 1A showing an enlarged area including saw teeth.

FIGS. 3-4 are side and top views of the apparatus of FIG. 1, with the saw blade and adapter exploded from the pole.

FIG. 6A is an exploded view of the adapter with the foam removed, from FIG. 6.

FIGS. 7-8 are perspective views of the friction clamp, FIG. 7 showing an assembly, FIG. 8 showing an exploded view.

DETAILED DESCRIPTION OF PREFERRED EMBODIMENT

Figure 5:
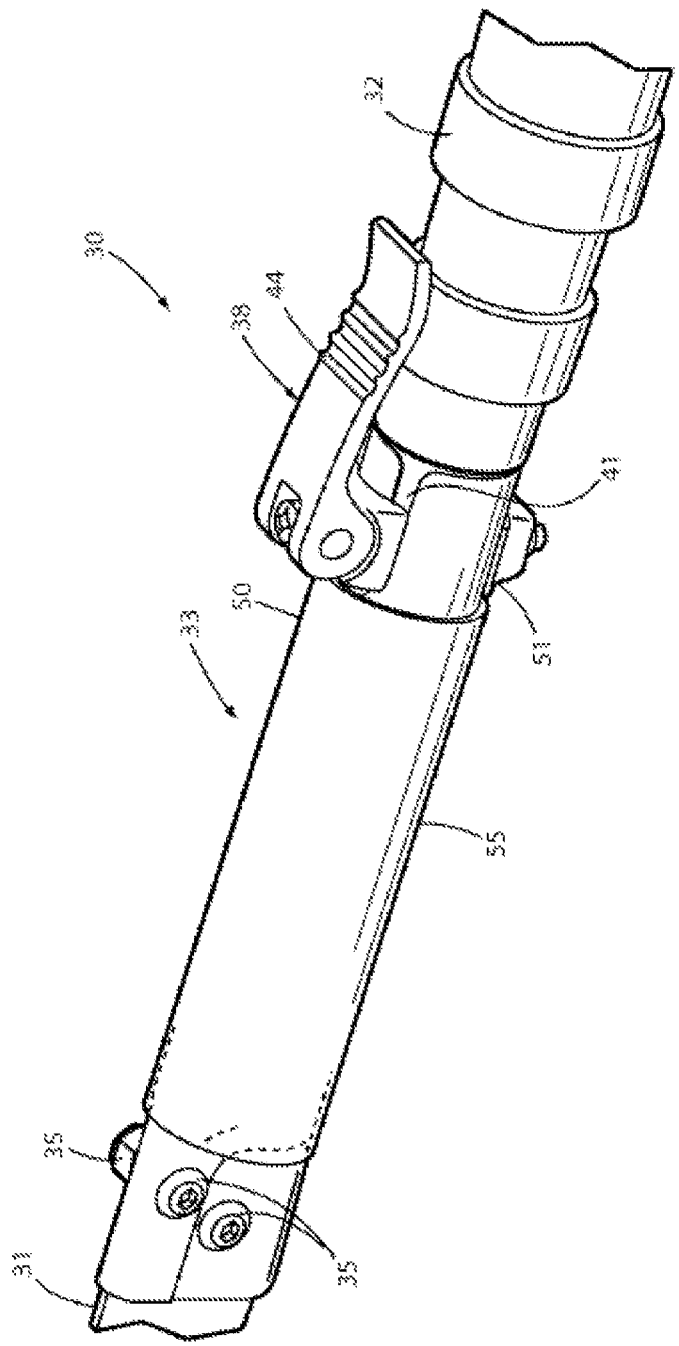
FIG. 5 is an enlarged view of the adapter attached to the saw blade and pole in FIG. 1.
Figure 6:
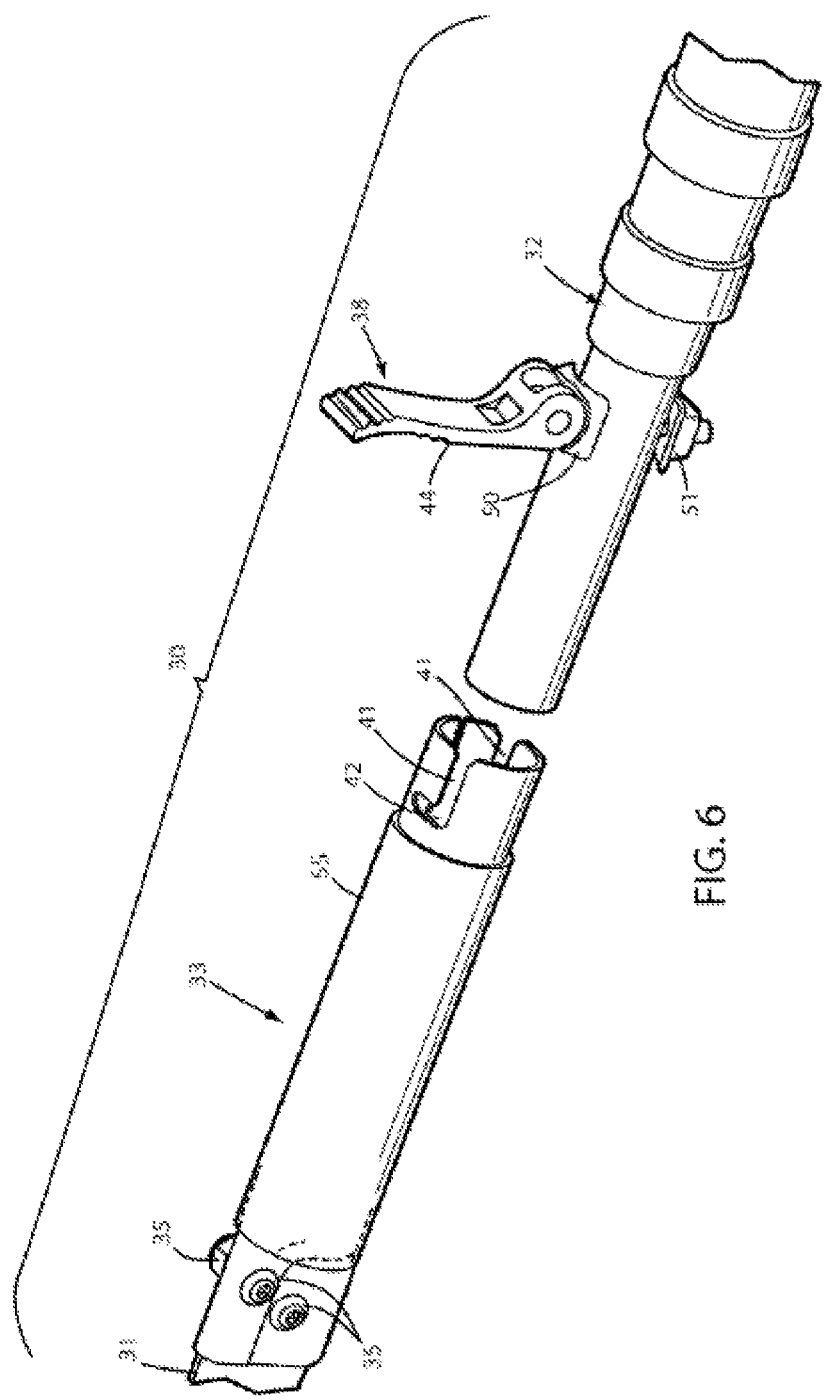
FIG. 6 is an enlarged view of the foam-covered adapter attached to the saw blade but exploded from the pole in FIG. 3.
Figure 8:
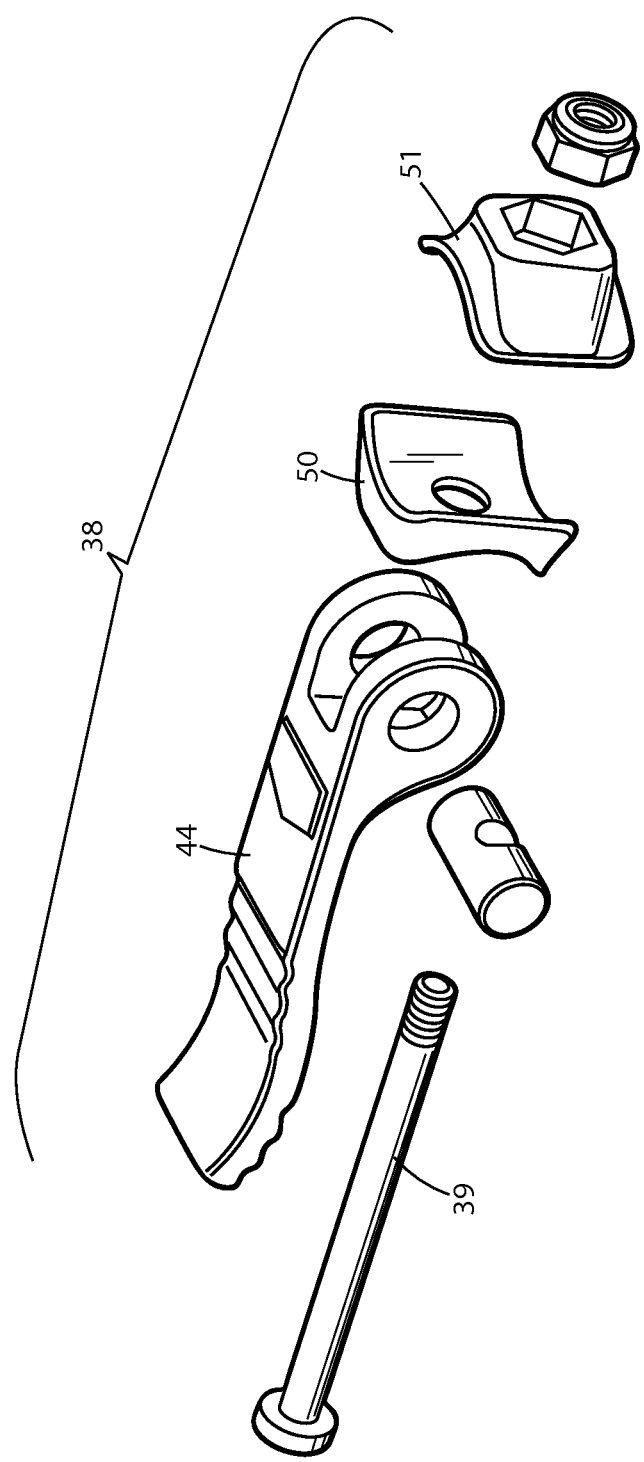
Figure 10:
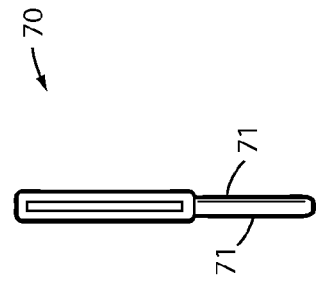
FIGS. 9-12 are side, end, top and longitudinal cross sectional views through a scabbard shaped to receive the saw blade.
Figure 9:
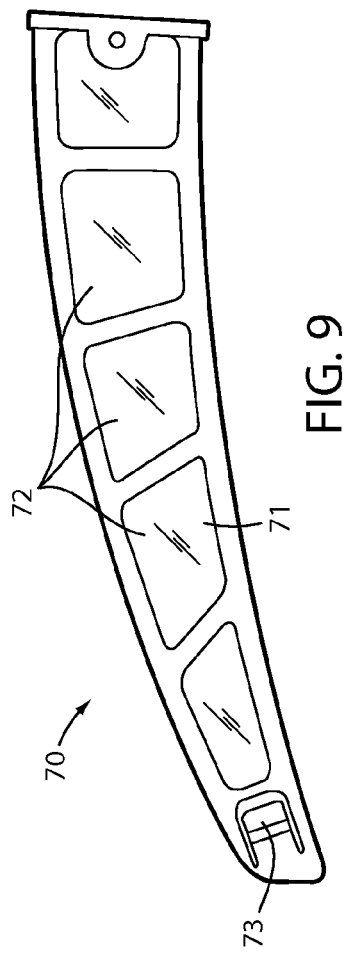
Figure 11:
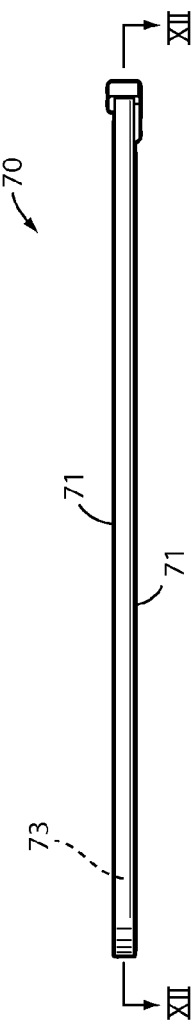
Figure 12:
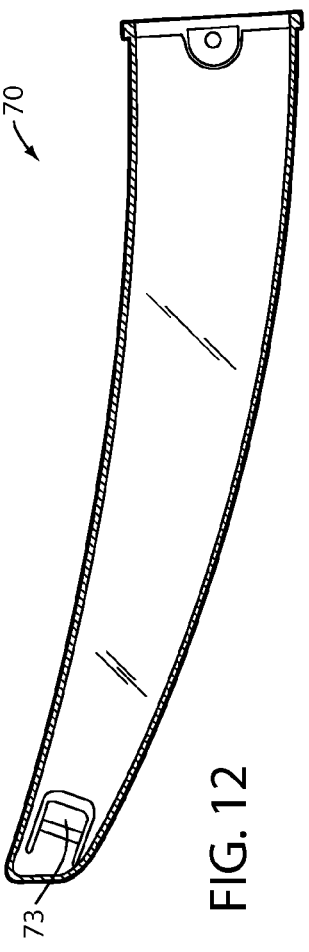

The present pole saw apparatus 30 (FIGS. 1-6) comprises a saw blade 31, a telescopingly-extendable pole 32 (with clamps for selectively holding it in extended and collapsed positions), and a tubular adapter 33 connecting the saw blade 31 to the pole 32. The adapter 33 includes a blade-receiving end 34 that is obround (i.e. parallel flat sides with round ends joining the flat sides) to stably telescopingly engage sides of attachment end of the saw blade 31, with two fasteners 35 (i.e. nuts/bolts) fixing the blade 31 on the adapter 33. The adapter 33 (FIGS. 5-6) also includes a pole-engaging end 36 that is cylindrically shaped to telescopingly engage the pole 32. A friction clamp 38 includes a transverse shaft 39 (FIGS. 7-8) that is shaped to slide into longitudinal slots 41 and then rotate into circumferential slots 42 in the pole-engaging end of the tubular adapter 33 so that the adapter 33 cannot be longitudinally removed. The friction clamp 38 further includes a rotatable cam handle 44 that can be manipulated/rotated about an axis perpendicular to a length of the pole so that, when rotated, it pulls on (i.e. tensions) the shaft 39 to create friction to hold the adapter 33 on the pole 32. When rotated to create friction, the handle 44 of the clamp 38 rests tight against the pole, in and out-of-the-way stored position.

The saw blade 31 (FIGS. 1-2) has an apertured end with holes aligned with mating holes on the adapter 33 for receiving the fastener nuts/bolts 35. The pole 32 has a tubular cylindrical anchoring end for mating engagement with the pole-engaging end of the adapter 33. The clamp 38 (FIGS. 7-8) includes first and second tube-engaging pieces 50 and 51 on opposite ends of the shaft 39. The first tube-engaging piece 50 has a first cylindrical surface engaging the anchoring end of the pole 32 and has an opposite arcuate surface operably slidably engaging a cam on the cammed handle 44 so that when rotated, the cammed handle 44 pulls the shaft 39 to thus tension the first and second tube-engaging pieces 50 and 51 toward each other to create friction. The fastener nuts/bolts 35 securing the blade 33 (FIG. 1) preferably include two bolts, longitudinally offset for optimal stress distribution, which fix the saw blade 31 on the adapter 33 and pole 32, with a base of the blade 31 being generally in-plane with a centerline of the adapter 33 and in-plane with a centerline of the pole 32. It is noted that the illustrated blade 31 has a curve shape which facilitates sawing. However, it is contemplated that the present innovation includes differently shaped blades.

A sleeve of foam 55 covers a cylindrical outer surface of the adapter 33 to form an ergonomic handle on the adapter 33 which is ergonomically shaped, comfortable, and located adjacent and in-line with the blade 31. As shown in FIGS. 3-4, the saw blade 31 and adapter 33 form a unit that, when taken off the pole 32, can be used as a short-handled saw. The foam 55 is optimally positioned to support this separated function, ergonomically and comfortably.

FIGS. 9-12 are side, end, top and longitudinal cross sectional views through a scabbard 70 (also called a "blade cover" or "shield") shaped to cover and protect the blade 31. The scabbard 70 includes sidewalls 71 joined at top and bottom edges to define a recess shaped to mateably closely receive the blade 31. The scabbard 70 is preferably made of polymer, and includes recesses 72 formed in the sidewalls 71 to reduce total material, reduce weight, and to facilitate molding the scabbard 70. An inwardly-biased finger-like resilient retainer 73 is integrally formed in one or both of the sidewalls 71. The illustrated resilient retainer 73 includes opposing inwardly-extending resilient tabs that are biased inward to frictionally "pinchingly" engage the blade 31. The illustrated retainer 73 is positioned near an outermost end of the sidewalls 71 (near a tip of the blade 31) so that the blade 31 slides substantially fully into the scabbard 70 before the retainer 73 grips the blade 31. Also, the illustrated retainers 73 are defined by a U-shaped slot around the tab, with the root of the retainer 73 extending to the material of the sidewall 71 nearest an outer end of the scabbard, with the root acting as a leaf spring to provide an inward bias to the tabs.

Figure 13:
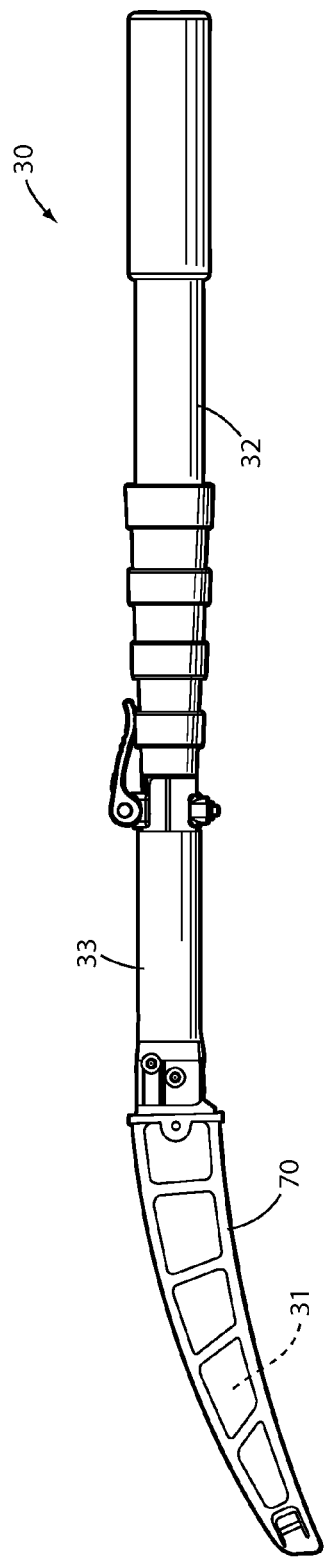
FIGS. 13-14 are side and top views showing the scabbard of FIG. 9 on the saw of FIG. 1.
Figure 14:
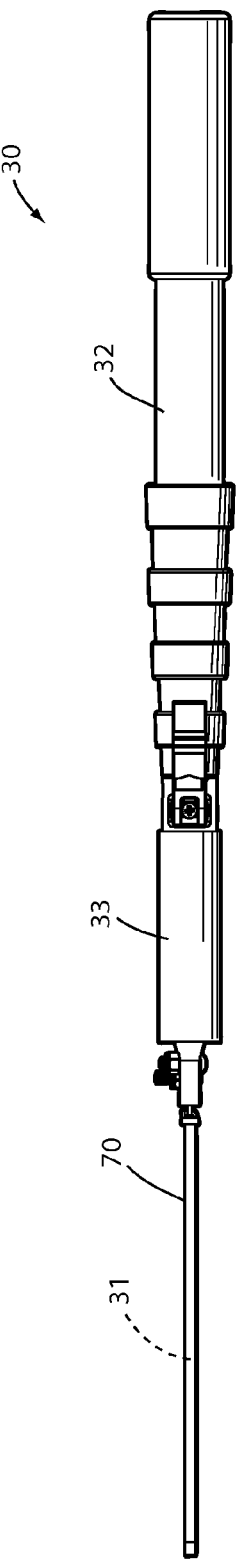

The scabbard 70 can be easily and quickly slipped onto (or off from) the blade 31 to protect the blade 31, with the scabbard's retainer 73 frictionally engaging the blade 31 to "self-retain" the scabbard 70 on the blade 31. FIGS. 13-14 are side and top views showing the scabbard 70 of FIG. 9 on the pole saw apparatus 30 of FIG. 1. It is contemplated that the scabbard 70 can be made of any durable structural polymeric material, such as a polyolefin like polypropylene, and can be made as a unitary injection molded part that does not require assembly or secondary processing. Nonetheless, a scope of the present invention includes alternative scabbard constructions.

The present innovative design provides a surprisingly strong and durable connection. This strength and stress distribution is accomplished in significant part by the overlapping and large section of the tubes on the adapter and pole, with a precision fit mating tube of the adapter being made from medium carbon steel. When rotated into the locked position, the steel tube adapter simply cannot be pulled off the end of the pole, which is a significant benefit given the forces that occur when using the apparatus to saw off a limb. The steel tube adapter provides a surprising strength at the connection point due to the amount of surface area contact between the mating tub components of the adapter and pole (and between the adapter and blade). The overall connection and manufacture of components of the present apparatus is very simple and strong. No aluminum or plastic is tensioned or stressed in a way leading to premature and/or unexpected catastrophic failure. Also, the present arrangement facilitates quick change between using the pole-supported blade and adapter to "pole-saw", and using the adapter-only-supported arrangement to manually "short-saw" while using the adapter as a palm-engaging handle.

Thus, it is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A pole saw apparatus comprising:
   a saw blade with an apertured end for attachment;
   a pole with an anchoring end for attachment;
   a tubular adapter having a blade-receiving end and a pole-engaging end, the blade-receiving end being obround and shaped to stably telescopingly engage sides of the apertured end of said blade, the pole-engaging end being cylindrically shaped to telescopingly engage the anchoring end of the pole and including at least one "L"-shaped slot, said at least one "L"-shaped slot having an axial portion extending axially from said pole-engaging end of said tubular adapter inwardly into said tubular adapter, and a second, circumferential portion extending from circumferentially from said axial portion of said "L" shaped slot and around a portion of said tubular adapter;
   at least one fastener extended through aligned holes in the apertured end and through the tubular adapter to secure the apertured end in place; and
   a clamp including a shaft that extends transversely through the anchoring end of said pole, the shaft being shaped to slip into said at least one "L"-shaped slot in the pole-engaging end of the tubular adapter and then rotate into said circumferential portion of said at least one "L"-shaped slot so that the shaft cannot slide longitudinally out of engagement with the pole-engaging end of said tubular adapter, the clamp further including a cammed handle that is movable between a first position where the pole-engaging end can be rotated and slid longitudinally in the anchoring end, and that is movable to a clamped position where the pole-engaging end is clamped and frictionally prevented from rotation and/or sliding in the anchoring end.

2. The apparatus of claim 1, wherein the clamp includes first and second tube-engaging pieces, the first tube-engaging piece having a first cylindrical surface engaging the anchoring end of the pole and having an arcuate surface operably slidably engaging a cam on the cammed handle so that when rotated, the cammed handle pulls the shaft to thus tension the second tube-engaging piece laterally to create friction.

3. The apparatus of claim 1, wherein the at least one fastener includes two bolts fixing the saw blade, holding the blade in-plane with a centerline of the adapter and in-plane with a centerline of the pole.

4. The apparatus of claim 1, including a sleeve of foam on the adapter that forms a handle that is ergonomically shaped and located adjacent and in-line with the blade.

5. The apparatus of claim 4, wherein the adapter and blade can be removed from the pole and used together as a hand-held saw with a short handle.

6. The pole saw apparatus of claim 1, wherein said at least one "L"-shaped slot includes a plurality of "L"-shaped slots.

7. The pole saw apparatus of claim 1, wherein said at least one "L"-shaped slot includes a pair of opposing "L"-shaped slots disposed 180 degrees from each other circumferentially about said tubular adapter.

8. A kit comprising the pole saw apparatus of claim 1, and a scabbard removably disposed on said saw blade, said scabbard being configured to protect the saw blade from damage and abuse when the pole saw apparatus is not in use, the scabbard including at least one retainer configured and arranged to hold the scabbard on the saw blade when positioned on the blade, said retainer including at least one inwardly-extending resilient tab that is biased inwardly to frictionally engage said saw blade, said retainer being located near a distal tip of the scabbard such that the saw blade slides substantially fully into said scabbard before said retainer grips said saw blade.

9. The kit of claim 8, wherein the at least one retainer is integrally formed of a same material as the scabbard and is integrally connected to the scabbard without separate fasteners.

10. The kit of claim 8, wherein the at least one retainer and scabbard are integrally molded of a same material which is resilient, said retainer being configured to act as a leaf-spring.

\* \* \* \* \*